United States Patent Office 2,732,295
Patented Jan. 24, 1956

2,732,295

METHOD OF MAKING MINERAL WOOL INSULATION

Frederick H. Hollenberg, Jr., Maple Heights, Ohio, assignor to Baldwin-Hill Company, Trenton, N. J., a corporation of New Jersey No Drawing. Original application May 2, 1946, Serial No. 666,807. Divided and this application September 22, 1952, Serial No. 310,920

9 Claims. (Cl. 92—21)

The present invention relates to an inorganic fibre insulating material of unusual and improved properties, and to a wet process of producing the same, and more particularly, it relates to an insulating sheet material which is characterized by its fire-resistance. In addition, the invention relates to an aqueous resinous composition which is available for use in the production of inorganic fibrous insulating material possessing water- and fire-resistant properties. The present application is a division of application Serial Number 666,807 filed May 2, 1946, now Patent Number 2,633,433.

One object of this invention is to provide an inorganic fibre insulating material, which, while relatively light, possesses high flexural strength, is waterproof, fireproof, and has high electrical and thermal insulating values.

Another object is to furnish an insulating material which possesses, in addition to other desirable properties, fire-resistance and which, if raised at one portion to the combustion temperature of the resin, will provide a barrier preventing propagation of thermal decomposition in adjacent portions of the product.

A further object is to provide an economic and commercially practical method of producing an insulating material comprising inorganic fibrous material, a synthetic resin binder, and bentonite, the latter ingredient not only imparting fire-resistance and other desirable properties to the product but also facilitating the practice of the process.

Still another object of the invention is to provide a method of producing an insulating material by which various types of thermosetting resins, including a soluble resin even in a very dilute solution, may be used and in which the white water may be utilized to make up new stock solutions.

Still another object is to provide a resinous composition comprising a soluble thermosetting resin in solution in an aqueous medium and a fire-retardant in suspension therein, which composition is available for use in the production of insulating material of improved properties.

Other objects will be apparent from a consideration of this specification and the claims.

The insulating material of the present invention comprises an interfelted web of inorganic fibrous material and a synthetic resin in its insoluble, infusible stage and bentonite incorporated in said interfelted web, the resin and bentonite providing water-resistance and fire-resistance, respectively, to the product as will hereinafter be discussed. In one preferred embodiment, the resin and bentonite are distributed throughout the interfelted web substantially uniformly, but, if desired, the product may have more resin in the outer sections than in the center section and the resin may even be substantially confined to the outer sections.

The product may be prepared by any process in which a thermosetting resin and bentonite in the presence of an aqueous medium is incorporated in inorganic fibrous material, the fibres of which are interfelted in an aqueous suspension thereof and in which the resin after its association in the interfelted web is converted by heat to the infusible, insoluble stage. Since the bentonite is incorporated in the inorganic fibrous material in the presence of an aqueous medium, the water will swell the bentonite and the final product will contain bentonite in its swollen state.

In the preferred embodiment of the invention, the sheet of insulating material which is subjected to heat to convert the resin is formed from an aqueous suspension of the fibrous material by the use of a screen to remove water therefrom. Preferably, the thermosetting resin and bentonite are mixed with the aqueous suspension of the inorganic fibres, for example, in the beater or the mixing or agitating tank or the head box, but if desired a soluble liquid resin and the bentonite may be added to the interfelted web, for example, to the wet fibre on the sheet-producing screen or subsequently. If desired, instead of forming the interfelted web from an aqueous suspension by the use of a screen, a smaller amount of water may be employed and the resulting suspension may then be deposited either continuously on a conveying system or batch-wise into forms. As will hereinafter appear, other additives, such as a supplemental fire-retardant, a defoaming agent, a bentonite-viscosity reducing agent or both may advantageously be added at a suitable point in the process. By inorganic fibres is meant what is generally known in the industry as glass wool, mineral (rock or slag) wool, and asbestos fibres and all these will be referred to generally herein as fibres. Any one of these fibrous materials may be used advantageously in the process, the use of mineral wool being generally preferred, and mixtures of any two or all of them in varying proportions may be utilized. For example, portions of long fibre asbestos, such as amosite, may be advantageously mixed with glass wool or rock wool, or both, to provide additional strength to the finished board.

In the case of the use of the glass or rock wool, either long-fibre or loose wool, or what is known in the trade as granulated or nodulized wool may be used. The granulated or nodulized wool is prepared by nodulizing the wool on a rotary screen which also removes the major portion of the shot, that is the glass-like granules of non-fiberized material. When long-fibre wool is used, a large percentage of the shot is advantageously removed in the process, for example, by a riffle box. The removal of the major portion of the shot is important since, obviously, substantial quantities of it will seriously alter the weight of the finished board without changing the volume appreciably.

In the preferred embodiment of the invention, granulated or nodulized wool is employed since the finished product will have lower thermal conductivity, lower density, greater strength, and better handling properties, as compared to a product made from long-fibered wool. Mixtures of long-fibered and nodulized wool may be used if desired.

By "thermosetting resin" is meant any synthetic resin in an initial stage of polymerization which is convertible by heat to the insoluble, infusible state. Such resins may be used in any one of the three following forms: (1) as an aqueous solution of a water-soluble liquid thermosetting resin: (2) as an aqueous emulsion of a water-insoluble thermosetting resin in liquid form; and (3) as an aqueous dispersion of a water-insoluble thermosetting resin in a dry powdered finely divided form. Mixtures thereof may also be used if desired. The first two forms contain liquid resins as distinguished from the powdered resin of the third form.

While any of the thermosetting resins, or mixtures thereof, may be employed, for example, phenol-formaldehyde, resorcinol-formaldehyde, urea-formaldehyde, and furfural-formaldehyde, the use of a phenol-formaldehyde resin, that is a resin produced by reacting a phenol with a formaldehyde-yielding substance, is preferred. Examples of the phenols are phenol, cresol, and xylenol; and examples of formaldehyde-yielding substances are formaldehyde, paraformaldehyde, and hexamethylenetetramine. The usual extenders of modifiers such as "Vinsol resin," which is a thermoplastic, hydrocarbon-insoluble resin derived from pine-wood, containing phenol, aldehyde and ether groups; "Dresinate," which is a sodium or potassium soap of rosin, and the like may be included in the resinous composition.

Bentonite is a generic term covering colloidal clays that have an affinity for water and swell in the presence thereof, and any of the various grades of bentonite, such as sodium-, potassium-, calcium-, or magnesium-containing bentonites may be used in the production of the product of the invention. Advantageously, a bentonite with a high water-absorptive capacity is employed and, as stated, the bentonite will be present in the product in a swollen state. Regardless of the type of resin employed, the presence of bentonite, either alone or with other fire retardants in the finished insulating material serves to render the product fire-resistant.

The resins used in this process, being of a combustible nature, will undergo thermal decomposition when subjected to high temperatures, even when the resin is incorporated with the inorganic fibrous material in the finished product. The inorganic fibres in the finished product form an insulating blanket over the resin particles preventing the heat of combustion from being dissipated, and, due to the presence of the fibres, air can breathe through the material to support combustion. It can be seen therefore, that if any portion of the binder is raised to the combustion temperature of the resin, thermal decomposition will spread throughout the entire product unless some means is provided to prevent such action.

The presence of the bentonite in the finished product serves as the means for preventing the propagation of thermal decomposition through the product. Bentonite acts as an excellent fire-retardant for all the various types of thermosetting resins that may be used in the production of the insulating material since the bentonite provides a mechanical barrier between the portion of the product which has been raised to the combustion point of the resin and the adjacent portions. In the event the product is subjected to a temperature sufficiently high to cause fusion of the bentonite, the fused bentonite then serves as the barrier. This condition occurs during the application of the insulating material to a metal surface by metal pins, since in such a process the pins are arc-welded to the metal surface. Thus, if the material is ignited at one portion, the combustion will not spread to other portions due to the barrier provided by the bentonite.

The bentonite is used, in any particular case, in an amount to provide the desired fire-resistance to the product. The amount employed will be dependent on the quantity of resin in the product. When optimum fire-resistance is desired, the amount of bentonite will usually exceed the resin content; for example, with a product containing 5% resin, about 8% bentonite may be present, whereas with a resin content of 3%, the bentonite content may only be about 5%.

As previously stated, if desired, the fire-retardant characteristics of the bentonite may be supplemented by the presence in the product of another fire-retardant. While various chemicals having fire-retardant properties may be used with the bentonite, zinc ammonium phosphate has been found to be particularly effective. The choice of the particular supplemental fire-retardant employed will depend upon its ability to be used in the process without undesirable reaction with the resin and to be retained in the finished material. Certain substances having fire-retardant properties are not available for use due to their reactivity with the resin, for example, zinc borate may be used with a powdered resin but not with the liquid resin due to its reactivity with the latter.

The proportions of inorganic fibre, resin, and bentonite in the finished product may vary widely but since these three ingredients are associated in the presence of water, the relative amounts thereof will depend upon the particular type of process used in the preparation of the product. Generally, the finished material will contain from about 55% to about 97% of inorganic fibre, from about 1% to about 30% of the heat-converted resin, and from about 2% to about 25% of bentonite. Insulating material having particularly advantageous properties may contain from about 70% to about 97% of inorganic fibre, from about 1% to about 10% of the heat-converted resin, and from about 2% to about 18% of bentonite, for instance, from 85% to 90% fibre, 4% to 6% resin, and 6% to 8% bentonite. In a typical example, the insulating material contains 87% rock wool fibre, 5% of a phenol-formaldehyde resin converted to its infusible, insoluble state, and 8% of bentonite; in another example, the finished product contained 92% of rock wool fibre, 3% of a heat-converted phenol-formaldehyde resin, and 5% of bentonite. When a supplemental fire-retardant is included in the product, the amount thereof may vary from a very small amount, for example, a few tenths of a percent up to 5% or even more, based on the weight of the resin, and the amount employed in any particular case will be determined by the degree of supplemental fire-retarding action desired.

The insulating material of the present invention is characterized not only by fire-resistance and water-proofness, but also by high electrical and thermal insulation values. It is further characterized by high flexural strength, sound absorbing properties, and resistance to vibration. Referring to water-resistance, a sample of the insulating material of the invention was found to have absorbed less than 6% water in an atmosphere of 95% relative humidity at a temperature of 120° F. Even when the material was submerged in cold, hot, or boiling water, it did not deteriorate and after the wet insulating material was dried, the original strength was retained. Tests of the product by the Columbin time-temperature method showed no evidence of burning. Furthermore, the product is characterized by its ease of handling and may be utilized with a minimum of dusting and breakage and, therefore, with practically no industrial health hazard. The product may, therefore, be used in any application where such properties are desirable.

The weight per cubic foot of the product may vary over a wide range, depending upon the process steps employed in its production, as will hereinafter be described, and usually the weight per cubic foot will be between about 6 and 25 pounds. When the product is to be used as an insulating material for ships or in other applications where a light weight product is desired, the weight per cubic foot is advantageously between about 6 and 10 pounds.

As previously stated, various processes may be used in the preparation of the product, and the particular process depends on whether an aqueous solution, an emulsion, or a dispersion is initially employed. Furthermore, when an aqueous solution is employed, the process depends on whether the resin will remain in solution when the solution is brought into contact with the water employed in the process or whether the resin will precipitate under such conditions. These two types of initial aqueous solutions are termed "non-resin-precipitatable" and "resin-precipitatable," respectively. When bentonite is included in the aqueous solution of the resin, the dilutability of the solution without precipitation of the resin is markedly increased, so that a solution which is normally resin-precipitatable may become upon the inclusion of the bentonite the non-resin-precipitatable type.

In a typical case where it is desired to employ a non-resin-precipitatable solution and to provide a solution, after dilution with the water employed in the process, of 5% by weight of resin solids, an initial solution containing 70% resin solids and having a dilutability of at least 14 (water) to 1 (solution) by weight is employed. In a typical case where it is desired to employ a resin-precipitatable solution and to provide a suspension containing 5% by weight of precipitated resin solids after dilution with the water employed in the process, an initial solution containing 70% resin solids and having a dilutability of less than 14 (water) to 1 (solution) by weight is used. Illustrative of the effect of bentonite, if a solution containing 5% to 10% by weight of bentonite particles in suspension and 5% by weight of resin solids in solution, after dilution with the water employed in the process, if desired, it is not necessary to use an initial resin solution having a dilutability of at least 14 to 1, but a solution of a dilutability ratio of less than 14 to 1 may be employed provided the dilutability ratio is greater than about 4 to 1. Thus, the bentonite will serve to convert a resin-precipitatable solution into a non-resin-precipitatable solution.

It is to be understood that the resin content of the solution or suspension after the dilution by the water in the process may vary widely, for example, from about 1½% to about 20% by weight of resin solids, and that an initial resin solution to provide such resin content will be employed. This is also the case when a resin emulsion or dispersion is used.

Likewise, the bentonite content of the resin-water medium after the dilution by the water in the process may vary widely, for example, from about 1% to 18% by weight of bentonite, and an initial amount of bentonite to provide such quantity will be employed. The bentonite is preferably moistened with sufficient water to swell it before it is incorporated with the resin-water medium. When bentonite is employed in the upper portion of the range, for example, about 6% and above, the viscosity of the medium is high and, with relatively thick products, difficulty may be encountered in removing excess liquid from the interfelted web when a screen is used in the formation thereof. In order to decrease the viscosity of the medium, particularly when more than about 6% bentonite is present, it has been found that this may be accomplished by the inclusion in the resin-water medium of a small amount of a soluble polyphosphate; for example, sodium or potassium hexametaphosphate, tetraphosphate, or pyrophosphate, sodium tetraphosphate being preferably employed. When a soluble polyphosphate is employed, some of it at least will be present in the finished heat-converted product. The amount employed may vary from a few tenths of a per cent up to 3% or more based on the weight of the bentonite. The preferred range is from about 0.5% to about 1.5%. Thus, in a typical case, where an 8% suspension of bentonite (after dilution by the water in the process) was used, and 1% of sodium tetraphosphate was present, the viscosity was reduced approximately to that of a 5% bentonite concentration. In the case where the suspension of fibre, bentonite, and resin is sufficiently concentrated so that it is not necessary to remove excess water by a screen, the use of a polyphosphate is usually not required since a high viscosity is an advantage.

The process is preferably carried out by mixing the resin and the bentonite with the inorganic fibrous material before the interfelted web is formed, and in this type of process, the non-resin-precipitating solution, the resin emulsion or resin dispersion may be added to the beater, mixing, or agitating tank or head or delivery box to the screen used to form the web. If desired, instead of using a screen to form the web, a conveyor or stationary form may be employed. In this case, the use of granulated mineral wool is advantageous.

In the case a non-resin-precipitating solution, a resin-precipitating solution, or a resin emulsion is used, the interfelted web after its formation, for instance, on the web-forming screen or after removal therefrom either before or after drying may be treated with an aqueous medium containing the resin and bentonite. Since the web is formed from a water-suspension of the inorganic fibrous material, it is a "water-laid web," and as is usual in water-laid webs the major portion of the fibres therein are oriented in a plane substantially parallel to the plane of the web or sheet. If the dried sheet is treated, it may or may not be re-wet prior to the application of the resin-carrying medium, but, of course, if a precipitated resin is desired, the product must contain sufficient water to cause a precipitation of the resin when a resin-precipitatable solution is employed. Furthermore, if desired, instead of treating the interfelted web with an aqueous medium containing both the resin and the bentonite, the bentonite may be incorporated with the fibres prior to the interfelting step or subsequently thereto and after drying, the product may be treated with an aqueous solution or emulsion, for example, by spraying, dipping, or passing the solution or emulsion through the product.

When a resin-precipitatable solution is applied to the interfelted web, whether it be on the forming device or subsequently, the water associated with the web and the displaced water is drawn through the web as filtrate. Since the presence of the water in the web raises the amount of water in the resin solution above the critical dilution ratio, the resin is precipitated from the solution and is dispersed throughout the wet web.

The interfelted web of inorganic fibrous material, whether the resin be associated with the fibres prior to the formation of the web or thereafter, is advantageously formed on the screen of an Oliver filter or other type of revolving screen equipped with vacuum compartments, but, if desired, the web may be formed on the usual cylinder type of paper machine or on the screen of a Fourdrinier machine. Thereafter, the web is subjected to the action of a pressure roll or rolls in order to compact it to some extent and to smooth the surface and, after the treatment with the bentonite and resin as described, the interfelted web is dried and heated to convert the resin to the insoluble, infusible state. In the preferred embodiment of the invention, the interfelted web is formed by the process described in Patent No. 1,865,049, except when granulated or nodulized wool is employed, the riffle box may be omitted. As stated, the use of pressure rolls is recommended since they serve to establish the thickness of the product at a predetermined point. For example, in the preparation of a one inch board, the suction may be applied so that the stock will build up an interfelted web of approximately one and one-eighth inches and by passing under the pressure rolls the thickness may be reduced to one inch.

When the stock solution delivered to the screen contains the resin and bentonite, as well as the inorganic fibrous material, the solution may foam and, if this condition is encountered, a suitable foam-reducing agent may be added.

The interfelted web is subsequently heated to dry the web and convert the resin to the infusible, insoluble state and the product may be cut to the desired size, for example, by means of circular discs revolving at high speed, either before or after the drying and heat treatment. The interfelted material may be heated by any suitable means and the temperature of the heat-treatment will depend upon the particular resin present in the interfelted structure. Advantageously, the wet interfelted web is placed upon pallets which support it in a flat form and are designed to impart to the web a smooth flat surface. The pallets are placed on cars and the cars in turn are placed in a drying tunnel. The drying tunnel is usually kept at a temperature of between 250° F. and 550° F., a preferred range being between 300° F. to 350° F. At this temperature, the water is evaporated and the resin is converted to the infusible, insoluble state. The length of time of heat-treatment is a function of the temperature employed and usually requires three hours or more.

When the interfelted web contains a resin which is soluble in the residual water associated with the web, there is a tendency during the drying cycle for such resin to migrate to the outer surface. This migration results in a product that has a strong outer crust but a softer inner core. While such a product is at times desirable, the use of bentonite has the further advantage, when a product having a substantially uniform distribution of resin is desired, since when using such soluble resin, the bentonite reduces the amount of migration so that from a practical standpoint very little occurs, although there usually is a slight increase in resin concentration on the outer surface. This slight increase is beneficial since it ties in the particles of fibre very completely and provides a finished product which is easier to handle. In fact, in cases where the product has been cut to size before conversion of the resin, then the slight migration provides a product in which the surfaces thereof including the edges and ends are neatly sealed.

Regardless of the particular form of aqueous resin medium employed, it will be desirable to recirculate the water removed through the screen. This is particularly important when a non-resin-precipitating solution is employed since the resin and bentonite content of the white water remains substantially constant. Such a solution is normally relatively unstable and there is a tendency for the resin upon standing to separate from the solution. The use of bentonite in such a solution, however, makes it possible to obtain resin solutions stable over a period of months and, in fact, the stability of such a solution increases upon aging. The stability imparted to such a solution by the bentonite, therefore, makes it possible to recover and re-use the white water.

As stated previously, one object of the invention is to provide a resinous composition comprising a soluble thermosetting resin in solution in an aqueous medium and bentonite suspended therein, which composition is useable in the production of insulating material. In making such a composition, it will be desirable to first suspend the bentonite in water to swell it and then to incorporate it with the resin solution. The concentrations of bentonite and resin in the solution may correspond to those of the solution to be used in the production of the insulating material such, for example, as those given above, but it is advantageous to make a more concentrated solution, for example, a solution containing from 20% to 50% of resin and from 10% to 40% of bentonite and then to dilute this solution at the time of its use. The presence of the bentonite stabilizes the resin as hereinbefore described.

Considerable modification is possible in the proportions of the constituents of the insulating material of the invention, as well as in the steps of producing the same, without departing from the essential features of the invention.

I claim:

1. The process for producing mineral wool insulation in board form possessing a low density of between about 6 and 25 pounds per cubic foot, high strength, fire resistance and waterproofness which comprises mixing, with water, nodulized mineral wool, bentonite and a synthetic thermosetting condensation product selected from the group consisting of phenol-formaldehyde, resorcinol-formaldehyde, urea-formaldehyde and furfural-formaldehyde condensation products to provide a suspension in which the concentration of bentonite is between about 1% and about 18%, by weight, and of condensation product is between about 1½% and about 20%, by weight; continuously feeding said suspension to a continuously moving screen; drawing water from said suspension through said screen whereby the mineral wool fibres, with which bentonite and condensation product in intimate mixture with each other are associated, are felted into a thick sheet; drying and heating said sheet to convert the condensation product therein into the insoluble, infusible, state.

2. The process of claim 1 wherein a soluble alkali metal polyphosphate is present in the suspension.

3. The process of claim 1 wherein said condensation product comprises a phenol-formaldehyde condensation product.

4. The process for producing mineral wool insulation in board form possessing a low density of between about 6 and 25 pounds per cubic foot, high strength, fire resistance and waterproofness which comprises mixing, with water, nodulized mineral wool, asbestos fibres, bentonite and a synthetic thermosetting condensation product selected from the group consisting of phenol-formaldehyde, resorcinol-formaldehyde, urea-formaldehyde and furfural-formaldehyde condensation products to provide a suspension in which the concentration of bentonite is between about 1% and about 18%, by weight, and of condensation product between 1½% and about 20%, by weight; continuously feeding said suspension to a continuously moving screen; drawing water from said suspension through said screen whereby the mineral wool fibres and asbestos fibres, with which bentonite and condensation product in intimate mixture with each other are associated, are felted into a thick sheet; drying and heating said sheet to convert the condensation product therein into the insoluble, infusible state.

5. The process of claim 4 wherein a soluble alkali metal polyphosphate is present in the suspension.

6. The process of claim 4 wherein said condensation product comprises a phenol-formaldehyde condensation product.

7. The process for producing mineral wool insulation in board form possessing a low density of between about 6 and 25 pounds per cubic foot, high strength, fire resistance and waterproofness which comprises mixing, with water, nodulized mineral wool, bentonite and a synthetic thermosetting condensation product selected from the group consisting of phenol-formaldehyde, resorcinol-formaldehyde, urea-formaldehyde and furfural-formaldehyde condensation products to provide a suspension in which the concentration of bentonite is between about 1% and about 18%, by weight, and of condensation product between 1½% and about 20%, by weight; continuously feeding said suspension to a continuously moving screen; drawing water containing bentonite and condensation product from said suspension through said screen whereby the mineral wool fibres, with which bentonite and condensation product in intimate mixture with each other are associated, are felted into a thick sheet; drying and heating said sheet to convert the condensation product therein into the insoluble, infusible state, and recirculating said drawn water for re-use in the process.

8. The process of claim 7 wherein a soluble alkali metal polyphosphate is present in the suspension.

9. The process of claim 7 wherein said condensation product comprises a phenol-formaldehyde condensation product.

References Cited in the file of this patent

UNITED STATES PATENTS

| Number | Name | Date |
|---|---|---|
| 737,099 | Hall | Aug. 25, 1903 |
| 951,183 | Gaara | Mar. 8, 1910 |
| 1,160,365 | Baekeland | Nov. 16, 1915 |
| 1,841,678 | Russell | Jan. 19, 1932 |
| 1,887,726 | Weber | Nov. 15, 1932 |
| 1,972,493 | Powell | Sept. 4, 1934 |
| 2,011,915 | Seigle | Aug. 20, 1935 |
| 2,067,876 | Campbell | Jan. 12, 1937 |
| 2,151,357 | Reitzel | Mar. 21, 1939 |
| 2,195,272 | Ehlers | Mar. 26, 1940 |

(Other references on following page)

UNITED STATES PATENTS

| | | |
|---|---|---|
| 2,348,804 | Gerity | May 16, 1944 |
| 2,383,066 | McDermott | Aug. 21, 1945 |
| 2,407,376 | Maxwell | Sept. 10, 1946 |
| 2,448,186 | Miller | Aug. 31, 1948 |
| 2,485,458 | Quinn et al. | Oct. 18, 1949 |
| 2,567,559 | Grieder | Sept. 11, 1951 |
| 2,633,433 | Hollenberg | Mar. 31, 1953 |

OTHER REFERENCES

Manufacture of Pulp and Paper, 3rd ed. vol. V, sec. 1, pp. 17, 107.

Boehm: Paper Trade J. May 2, 1940 pp. 35–36.